US012213932B2

(12) United States Patent
Gopi et al.

(10) Patent No.: US 12,213,932 B2
(45) **Date of Patent: *Feb. 4, 2025**

(54) APPLYING PREDETERMINED SOUND TO PROVIDE THERAPY

(71) Applicant: Sound Health Systems, Inc., Los Altos, CA (US)

(72) Inventors: Paramesh Gopi, Los Altos, CA (US); Bryant Lin, Los Altos, CA (US); Peter Hwang, Los Altos, CA (US)

(73) Assignee: Sound Health Systems, Inc., Los Altos, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 18/196,629

(22) Filed: May 12, 2023

(65) Prior Publication Data

US 2023/0310264 A1 Oct. 5, 2023

Related U.S. Application Data

(63) Continuation of application No. 17/158,715, filed on Jan. 26, 2021, now Pat. No. 11,648,175, which is a continuation of application No. 17/028,432, filed on Sep. 22, 2020, now Pat. No. 11,039,980, which is a continuation-in-part of application No. 16/791,802, filed on Feb. 14, 2020, now abandoned.

(60) Provisional application No. 62/903,919, filed on Sep. 22, 2019.

(51) Int. Cl.
*A61H 23/02* (2006.01)

(52) U.S. Cl.
CPC ... *A61H 23/0236* (2013.01); *A61H 2201/165* (2013.01); *A61H 2201/501* (2013.01); *A61H 2205/023* (2013.01); *A61H 2205/025* (2013.01)

(58) Field of Classification Search
CPC ............ A61H 23/0209; A61H 23/0236; A61H 23/0245; A61H 23/0254; A61H 1/006; A61H 1/008; A61H 5/00–005; A61H 11/00–02; A61H 2011/005; A61H 21/00; A61H 39/007; A61H 2201/165; A61H 2205/023; A61H 2205/025
USPC ........................................................ 601/46–47
See application file for complete search history.

(56) References Cited

U.S. PATENT DOCUMENTS

2019/0142677 A1* 5/2019 Linder .................... A61F 7/034 601/18

OTHER PUBLICATIONS

Tarhan et al. "Acoustic rhinometry in humansL accuracy of nasal passage area estimates, and ability to quantify paranasal sinus volume and ostium size". Published Mar. 31, 2005. Journal of Applied Physics 99:616-623. https://doi.org/10.1152/japplphysiol.00106.2005 (Year: 2005).*

* cited by examiner

*Primary Examiner* — Valerie L Woodward
*Assistant Examiner* — Paige Kathleen Bugg
(74) *Attorney, Agent, or Firm* — Dickinson Wright PLLC; Steven C. Hurles

(57) ABSTRACT

A system, method and device for providing sound-based therapies to a user. The system, method, and device employ an initial measurement about a user (either or both distances on said user's head or recorded sound), a determination of a resonant frequency, and a wearable actuator affixed on said user's person with the ability to provide a unique resonant frequency to the user. The aspects disclosed herein may also incorporate microphones to optimize and monitor the treatment.

14 Claims, 17 Drawing Sheets

| | DATA POINT 1 | DATA POINT 2 | DATA POINT 3 | DATA POINT 4 | DATA POINT 5 | DATA POINT 6 |
|---|---|---|---|---|---|---|
| R | | | | | | |
| L | | | | | | |

FIG. 7A

APPLYING PREDETERMINED SOUND TO PROVIDE THERAPY

CROSS-REFERENCE TO RELATED APPLICATIONS

This application is a continuation of and claims the benefit of priority from co-pending U.S. patent application Ser. No. 17/158,715, entitled "Applying Predetermined Sound to Provide Therapy", filed Jan. 26, 2021, which is a continuation of and claims the benefit of priority from co-pending U.S. patent application Ser. No. 17/028,432, entitled "Applying Predetermined Sound to Provide Therapy", filed Sep. 22, 2020, which is a continuation-in-part of and claims the benefit of priority from U.S. patent application Ser. No. 16/791,802, entitled "Applying Predetermined Vibrations To Paranasal Sinuses", filed Feb. 14, 2020, which claims priority to U.S. Provisional Patent Application 62/903,919, entitled "Methods and Apparatus to Treat Rhinosinusitis", filed on Sep. 22, 2019, and is incorporated herein by reference.

BACKGROUND

According to the CDC, over 30.8 million people in the United States have been diagnosed with rhinosinusitis and many more suffer symptoms at home without being diagnosed by a physician. Rhinosinusitis is defined as inflammation of the sinuses and nasal cavity (or as noted in this application "sinus-related symptoms"). Common symptoms include sinus pressure/congestion, mucus drainage, headache, nasal congestion, rhinorrhea, fever, cough, and post-nasal drip. Treatment includes medications (oral antihistamines, nasal antihistamines, nasal steroids, antibiotics), saline washes, and surgery. These treatments are targeted to reducing inflammation, removing anatomic obstruction, increasing hydration/cleansing and reducing bacterial load.

In addition to rhinosinusitis, various other ailments have been found to be connected to the sinuses, for example, but not limited to, migraines and respiratory conditions.

Historically, various treatments have employed humming. Humming has been experimentally shown to reduce symptoms due to a reduction of nitric oxide levels induced by the humming. Further, treatments have similarly incorporated vibrations, with the effect associated with humming being similarly realized.

A technology known as bone conduction has existed in the audio space. Bone conduction uses the natural vibrations of a person's bones—such as skull, jaw and cheek bones—to hear sound. Bone conduction technology has improved hearing aid technology over the years, but it has other applications as well.

In addition to hearing aid technology, bone conduction has also been applied in the commercial head phone space, sitting a "bone conduction speaker" close to the ear, and using the fundamental concepts of bone conduction to transfer vibrations to the cochlear portion of the ear. The "bone conduction speakers" convert sound data into vibrations.

As noted above, there is a great need to improve the existing state of the art for treatments directed to curing and alleviating pain associated with rhinosinusitis/sinus-related symptoms.

SUMMARY

An aspect of some embodiments of the invention relates to a method and systems of applying predetermined sounds (at an approximated resonant frequency) to paranasal sinuses. The method includes receiving information from a patient, transforming said information into a resonant frequency, and applying said resonant frequency to the paranasal sinuses. Additionally, the application may be accomplished through a wearable device with an actuator.

Disclosed herein is a system for alleviating sinus-related symptoms including a wearable actuator configured to be worn by a user receiving the therapy associated with the sinus-related symptoms; a data store comprising a non-transitory computer readable medium storing a program of instructions; a processor that executes the program of instructions, and is electrically coupled to the wearable actuator The processor is configured to receive characteristics about a user of the wearable actuator; determine, based on the received characteristics, a resonant frequency; communicate to the wearable actuator the resonant frequency, and drive the wearable actuator to apply the resonant frequency to the user. The wearable actuator being configured to be worn on an area around a paranasal sinus and to deliver the resonant frequency via sound application device.

In another embodiment, the received characteristics are defined by one, some, or all of the following: a distance between the eye edge and a nostril edge of the user, a distance between the nostril edge and a nasal midpoint of the user, a top portion of a nose and a top of the teeth of the user, a distance between a middle back of the front teeth and a farthest point of a hard/upper palate of the user, and a distance between the lowest point of an eye socket to the top of the teeth.

In another embodiment, the received characteristics are extracted from an image of the user.

In another embodiment, the received characteristics are associated with a vocal input associated with the user.

In another embodiment, the system is further configured to activate the microphone to record sound while driving the wearable actuator.

In another embodiment, the system analyzes the sound, and adjusts the provided resonant frequency based on the sound.

In another embodiment, the system analyzes the sound, and adjusts the provided resonant frequency based on the sound.

In another embodiment, the image is from a photographic 2D or 3D representation of the user's face and/or mouth.

In another embodiment, wherein the image is from a CT scan of the user's face.

In another embodiment, the microphone is integrally provided with the wearable actuator.

Also disclosed herein, is a system for alleviating sinus-related symptoms. The system includes a wearable actuator configured to be worn by a user receiving the therapy associated with the sinus-related symptoms; a microphone situated on or around one the paranasal devices; a data store comprising a non-transitory computer readable medium storing a program of instructions; a processor that executes the program of instructions, and is electrically coupled to the wearable actuator. The processor being configured to determine a resonant frequency from either a default setting or a received setting from a network connection, communicate to the wearable actuator the resonant frequency, and drive the wearable actuator to apply the resonant frequency to the user. And while driving the wearable actuator, activating the microphone to record a sound; and based on the sound, adjusting the resonant frequency while the wearable actuator is being driven. The wearable actuator is configured to be worn on a paranasal sinus and to deliver the resonant frequency via bone conduction technology.

DESCRIPTION OF THE DRAWINGS

The detailed description refers to the following drawings, in which like numerals refer to like items, and in which.

DETAILED DESCRIPTION

Figure 1:
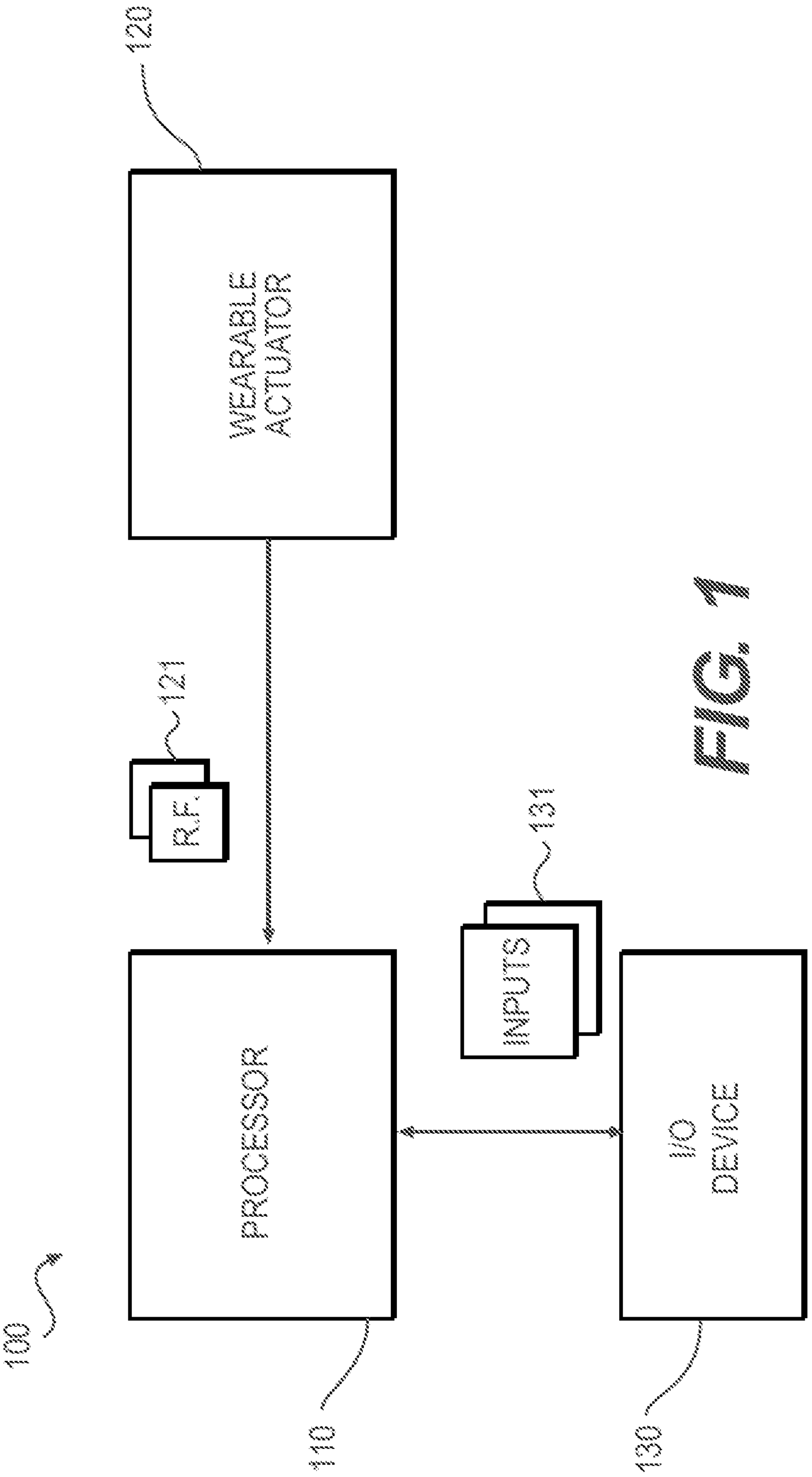
FIG. 1 is a block diagram illustrating a high-level description of a system exemplifying the aspects disclosed herein.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination of the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

As noted in the Background section, sinus-related symptoms affect a sizeable percentage of the population. However, existing remedies have not been effective in fighting sinus-related symptoms. The inventors have devised a unique system for alleviating sinus-related symptoms.

Additionally, the inventors have discovered that the aspects disclosed herein may be applicable to a variety of symptoms, including migraines and other respiratory illness. Also, while the aspects disclosed herein may be used in a manner responsive to pain or symptoms, the inventors have determined that said techniques may be used prophylactically.

The system disclosed herein may be implemented via a wearable-device or applied through a third-party (such as a medical professional), applying the methods and systems to facilitate the therapies disclosed herein. Additionally, the aspects disclosed herein may be implemented with a personal mobile device, or through a network-connected device. Various combinations and embodiments may be realized employing the aspects disclosed below.

Disclosed herein are systems for alleviating symptoms by applying a predetermined sound-based therapy. The symptoms may be sinus-related. Additionally, and as set forth, the system includes numerous embodiments for applying said remedy to the patient. Also disclosed are a variety of methods for inputting unique patient data, employing an algorithm for transforming said unique patient data to sound, and providing a therapy to the patient via a sound application device on one or more sinuses.

FIG. 1 is a high-level description of the system 100 disclosed herein. As shown in FIG. 1, a processor 110 is electrically coupled to an actuator 120 and an IO device 130. The electrical coupling may be any known connection employing wired or wireless technology. The processor 110 may be incorporated in a personal device, such as a mobile device, smart phone, smart watch, or any known personal device capable of performing the processing disclosed herein.

The IO device 130 (which will be discussed in greater detail below) may be any exemplary device or combination of devices to capture critical dimensions required for the processor 110 to develop electrical stimuli to control the actuator 120.

The actuator 120 (or wearable actuator 120) is a device intended to be placed on specific locations on a head of a person using the system 100, so as to apply sound to predetermined locations on a person receiving the sound-based therapy ("user"). The specific locations and an exemplary version of the actuator 120 will be described below. The elements that produce the sound may be placed relative to various predetermined sinuses.

In one non-limiting example, the inventors have found that placing the sound-producing device on a portion above the bridge of the nose, and affixed to the user, provides advantageous therapy. In another non-limiting example, the inventors have found that implementing the sound device/wearable actuator 120 as a bone-conduction speaker provides advantageous effects.

Figure 2:
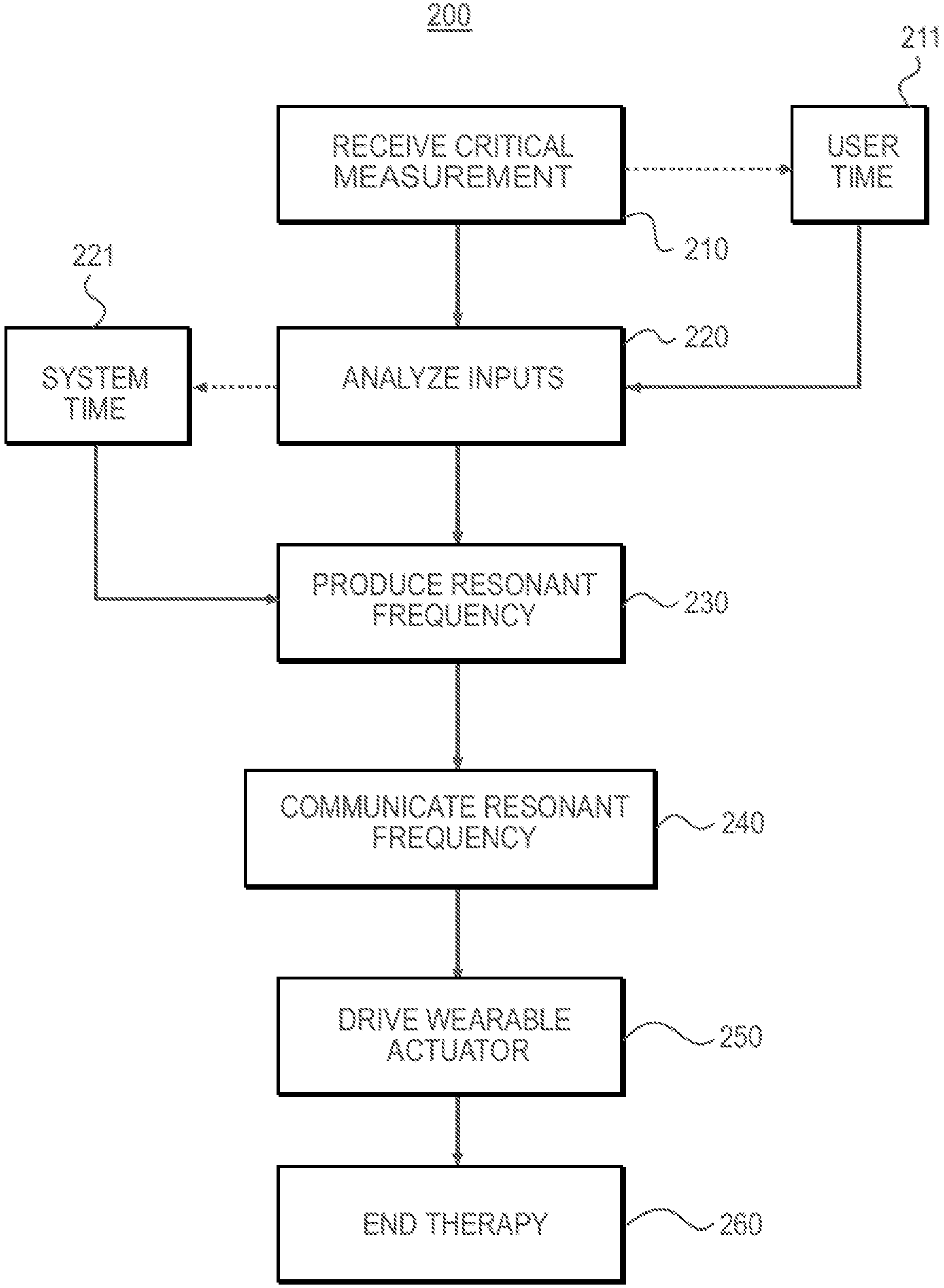
FIG. 2 illustrates a method for utilizing the system shown in FIG. 1.

The various components in FIG. 1 will now be described employing the flowchart shown in FIG. 2. FIG. 2 is a high-level method 200 illustrating the therapy provided by system of 100.

In step 210, a critical measurement is received. Some of the critical measurements are noted below in FIGS. 6(*a*)-(*d*). The measurements may be a manually entered value(s), a captured image of both an exterior and interior portion of a head of the user to receive the treatment, and/or a vocal characteristic. Alternatively, the critical measurements may be estimated through a variety of other methods.

The critical measurements may be input through a variety of IO devices 130. For example, but not limited to, the IO device 130 may be a keyboard, a touchpad, an image/video camera, a microphone, and/or other input devices known to one of ordinary skill in the art.

After employing IO device (or devices) 130 to receive the critical measurements in step 210, in step 220, the various inputs 131 are analyzed through either an exemplary algorithm described herein (stored in the processor through a data store), or through a user or system configured algorithm. The algorithm utilizes the various inputs 131 (via processor 110), to produce a resonant frequency 121. The various inputs 131 may be the critical measurements. Additionally, the various inputs 131 may contain information about the user (for example an identification). The identification may be used to retrieve a previously calculated resonant frequency 121. Alternatively, once a resonant frequency 121 is calculated, it may be stored and associated with the user.

An exemplary calculation of a resonant frequency 121 for one of the sinuses (a right or left maxillary sinus) is discussed below via equation 1 noted below in this specification.

Also show in FIG. 1 is a wearable actuator 120. The wearable actuator 120 may include a fastening portion, a device holding portion, and one or multiple bone conduction devices or speakers. The bone conduction speakers are configured to receive either a resonant frequency 121 (or data processed to replicate resonant frequency 121), and communicate sound to a portion of a wearer of the wearable actuator 120 proximal to a cavity proximal to the placement of the bone conduction speakers. In one non-limiting example, the sound is translated through vibrations generated from the bone conduction speakers. However, in other embodiments, sound may be applied through any device capable of providing sound.

The wearable actuator 120 may include a processor to receive the data (inputs 131), and generate a resonant frequency 121.

Through studies performed on corpses, the wearable actuator 120 being situated on the sinus, directly on a portion over the bridge of the nose, leads to a more efficient and effective therapy.

In step 240, the resonant frequency 121 is communicated (through electrical coupling) to the wearable actuator 120. The wearable actuator 120 may utilize bone conduction technology/speakers to translate the resonant frequency 121 to a sound that is communicated to a conduit on the user's face. In an exemplary implementation, the conduits may be associated with one or more of the pathways shown in FIG. 3. The wearable actuator 120 may apply sound (as generated from the resonant frequency 121), to the selected conduit(s) for a predetermined time. The predetermined time may be selected by a user (in step 211), or alternatively set by the processor 110 (221). The predetermined time may also be set based on the received characteristics from the IO device, transformed by a set relationship from said characteristics to time of therapy.

In step 250, the wearable actuator 120 is driven with the resonant frequency 121. Driving is defined as translating the resonant frequency 121 to sound, for example vibrations as generated from a sound producing device, such as a bone conducting speaker. In one embodiment the resonant frequency 121 is converted into a signal via the wearable actuator 120, or alternatively, data recognize-able by the wearable actuator 120 is produced by processor 110, and is communicated to said wearable actuator 120.

After a predetermined time has elapsed (either user set, system set, or manually instigated), method 200 completes by ending the therapy (260).

One example of a wearable actuator 120 of an implementation will be described in greater detail below, and generally will employ bone conduction speakers to transfer the resonant frequency 121 to the wearer/user of the wearable actuator 120. However, other embodiments applying sound directly to (wherein the device is physically on a portion of the skin over the user's sinus) may also be employed.

Figure 3:
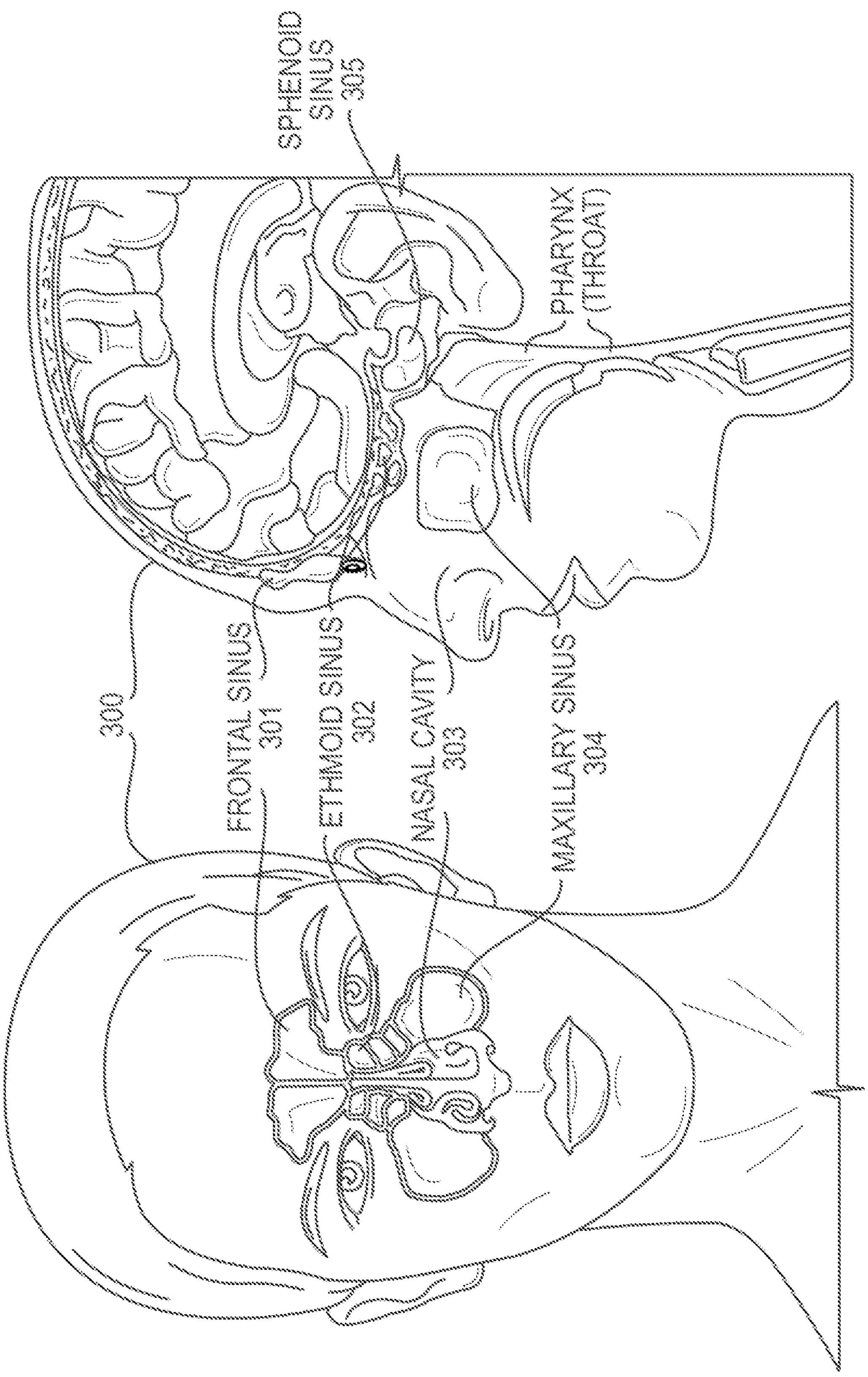
FIG. 3 illustrates an example of the paranasal sinuses.

FIGS. 3(*a*) and 4 illustrate various depictions of an exemplary head, with various reference points used in determining critical measurements used in step 210.

In FIG. 3, a frontal-view and a side-view of an illustration of a head 300 depicting exemplary sinus/nasal tracts on a person. These sinuses are a frontal sinus 301, an ethmoid sinus 302, a nasal cavity 303, a maxillary sinus 304, and a sphenoid sinus 305.

The nasal cavity 303 is shown as a reference and refers is a large, air-filled space above and behind the nose in the middle of the face. The nasal septum divides the cavity into two cavities, also known as fossae. Each cavity is the continuation of one of the two nostrils. The nasal cavity is the uppermost part of the respiratory system and provides the nasal passage for inhaled air from the nostrils to the nasopharynx and rest of the respiratory tract.

These sinus and nasal tracts may be referred to as paranasal sinuses, and collectively establish critical sinuses that allow access to areas where symptoms associated with inflammation and sinusitis may occur. Paranasal sinuses are a group of four paired air-filled spaces that surround the nasal cavity. The maxillary sinuses 304 are located under the eyes; the frontal sinuses are above the eyes 301; the ethmoidal sinuses 302 are between the eyes and the sphenoidal sinuses 305 are behind the eyes. The sinuses are named for the facial bones in which they are located.

Figure 4:
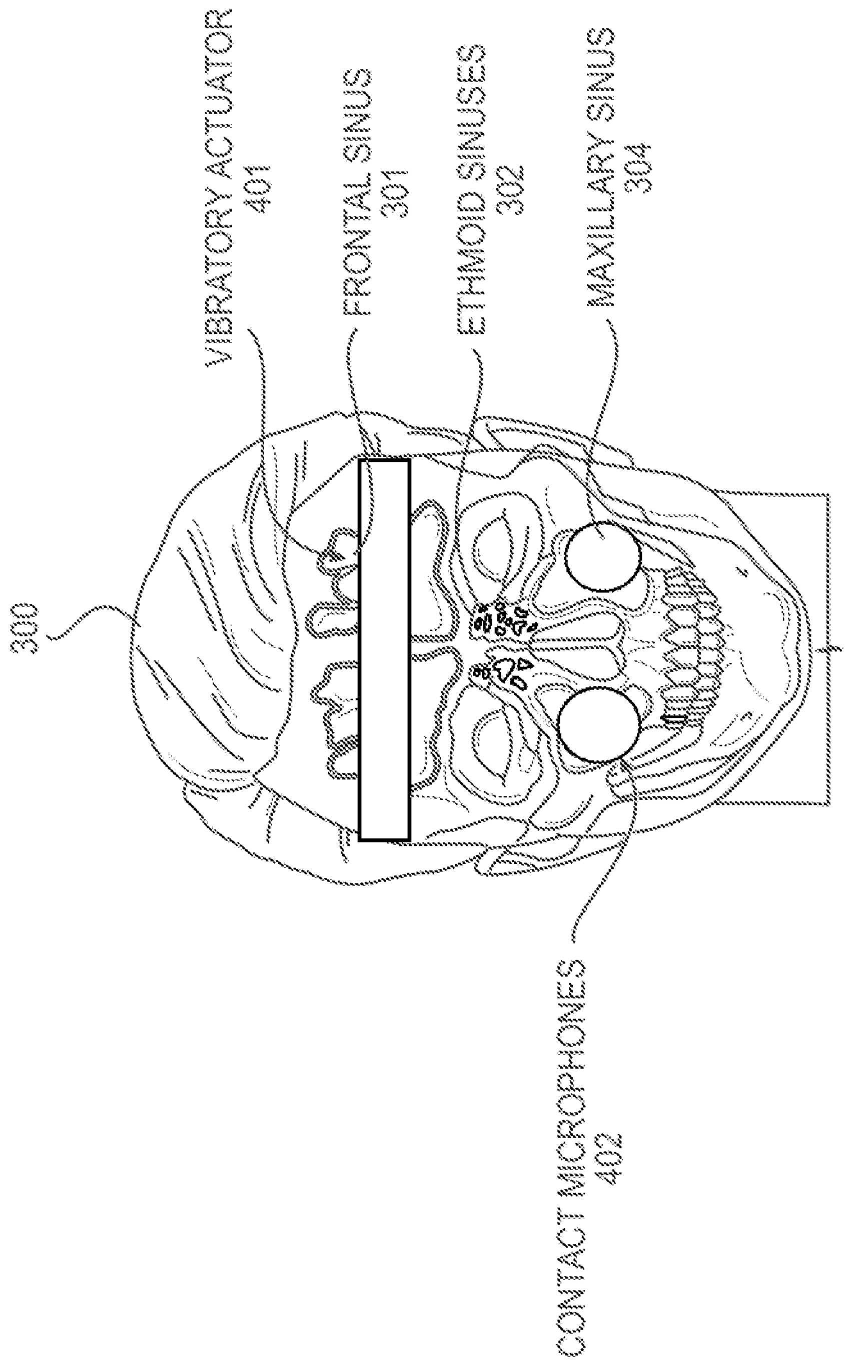
FIG. 4 illustrates a setup for a cadaver experiment based on FIG. 3.

FIG. 4 is a frontal view of the head 300 illustrating an experiment performable with a cadaver. Additionally, to the head 300 shown in FIG. 3, a sound producing device 401 is situated over the frontal sinus 301. Also included in FIG. 4 is a contact microphone 402, placed over a maxillary sinus 304.

Figure 5:
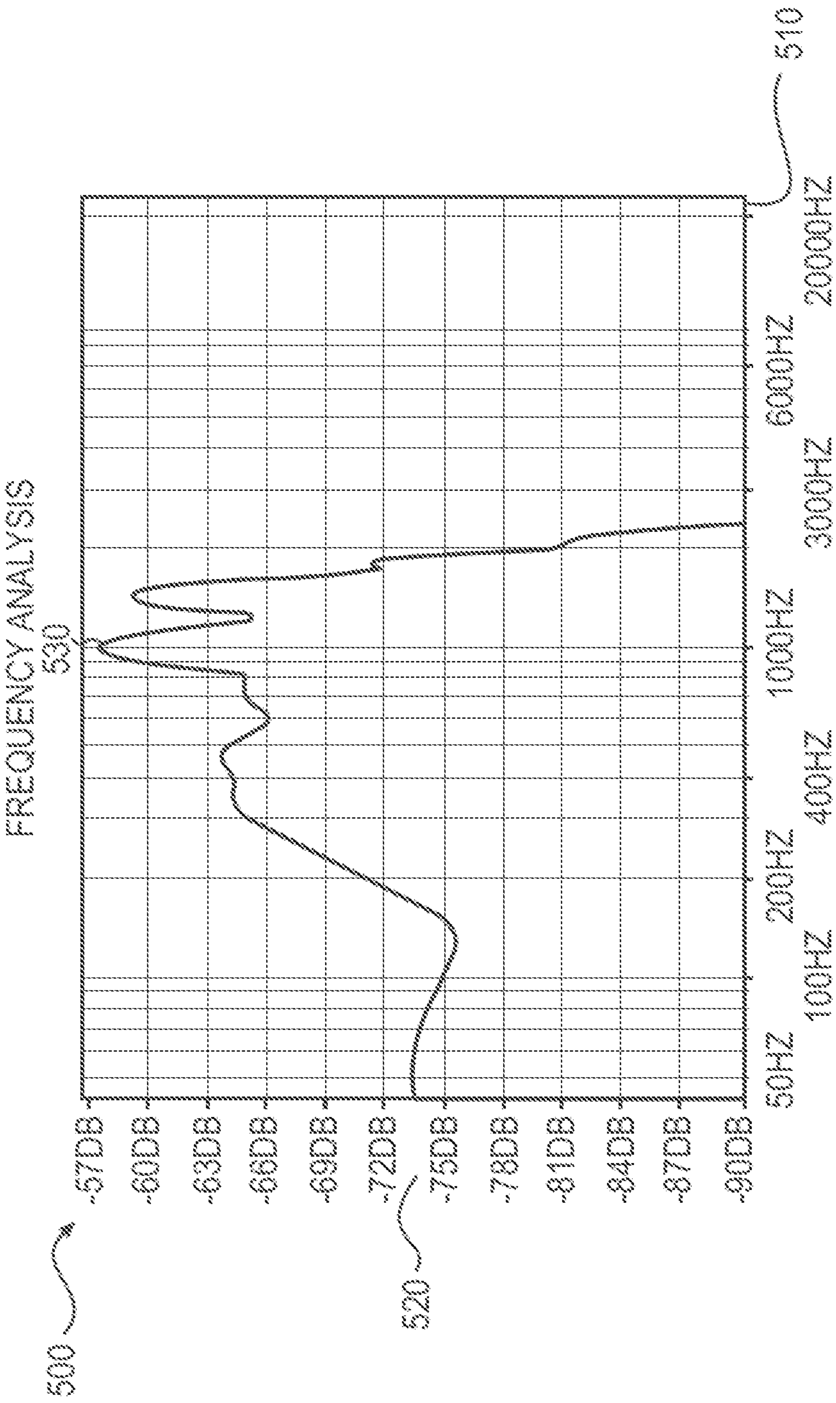
FIG. 5 illustrates the results of the cadaver experiment of FIG. 4.
Figure 6B:
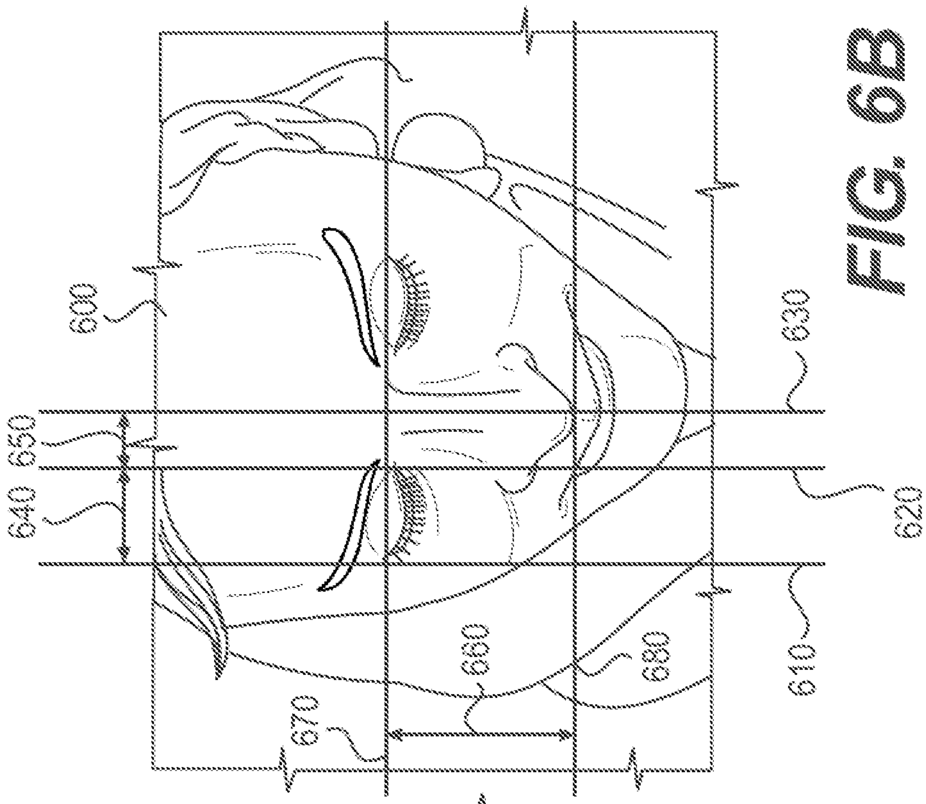
FIGS. 6(*a*)-(*d*) illustrate how various critical data points are achieved to use an input for the various systems disclosed herein.
Figure 6A:
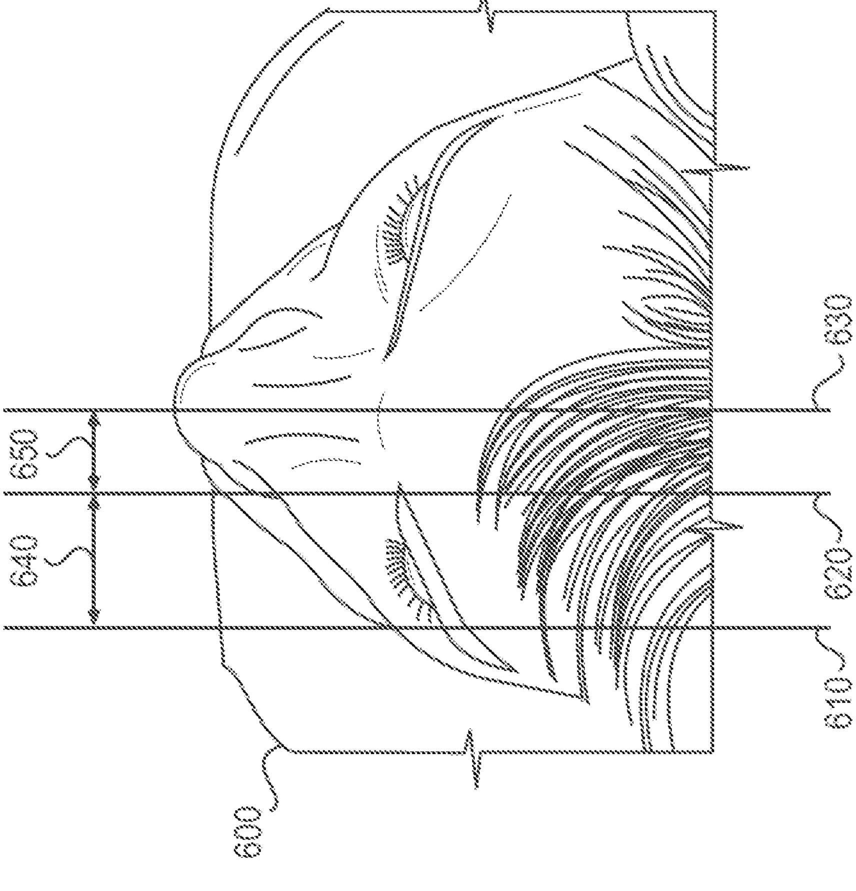
Figure 6C:
Figure 6D:
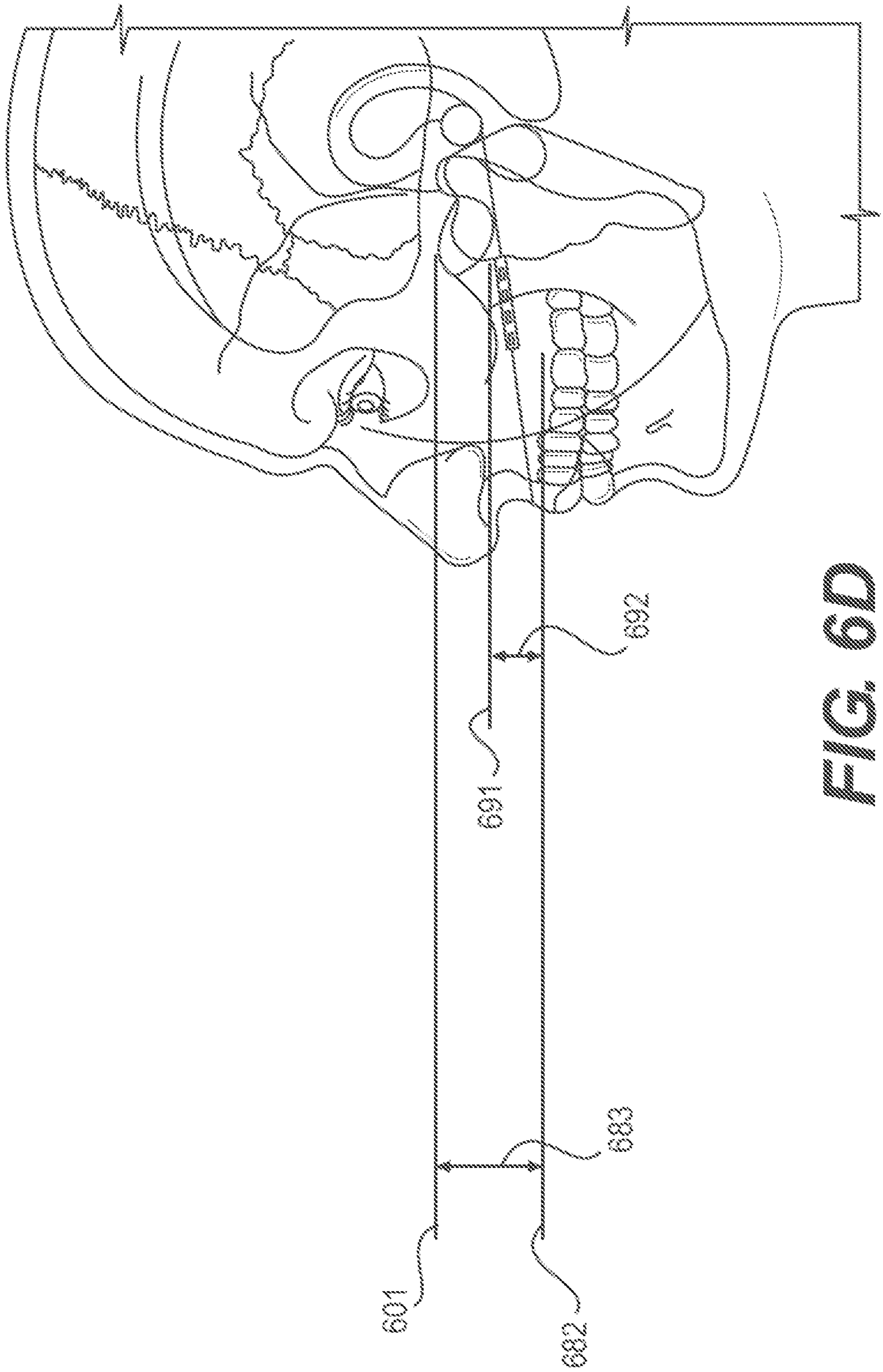

An experiment was performed utilizing cadavers and the setup in FIG. 4, and as shown in FIG. 5, graph 500 was produced. Graph 500 depicts a spectral analysis of sound as applied to a cadaveric head. On the X-axis 510, various frequencies are swept from a range of 50 Hertz to 3000 Hertz as applied via the vibratory actuator 401. On the Y-axis 520, the sounds generated through the application of a vibratory actuator 401 is captured via the contact microphone 402. Additionally, an air microphone (not shown) may be placed to augment the recording of sound.

In referring to graph 500, several resonant modes can be shown as peaks in the graph (one is shown via peak 530). Specifically, this is the resonant frequency of the sinus in which the microphone is nearest (referring to FIG. 4, the right and left maxillary sinuses, respectively).

The inventors have found that the resonant frequency associated with the resonant modes are related to certain critical dimensions, described in FIGS. 6(*a*)-(*d*). The transformation from the critical dimensions (or crano-facial points) is described via equations 1-5 below.

The inventors, through experiments performed on patients have shown that when the resonant frequency, as derived from the critical dimensions discussed in FIGS. 6(*a*)-(*d*), produces therapeutic effects. The resonant modes are optimal in providing the therapy disclosed herein.

The inventors have discovered several methods of determining a resonant frequency through the measurement of critical crano-facial measurements. In FIG. 6(*a*), a head 600 is shown. Three points are defined, an eye edge 610, a nostril edge 620, and a nasal midpoint 630. The distance between the eye edge 610 and the nostril edge 620, is defined as data point 1 640. The distance between the nostril edge 620 and the nasal midpoint 630, is defined as data point 2 650.

Referring to FIG. 6(*b*), a different view of head 600 is shown. In this view the generation of data point 3 660 is shown, which is defined by the top portion of the nose 670 and the top of the teeth 680.

To ensure the accuracy of these measurements, in an exemplary embodiment the measurements should be co-planar.

In FIG. 6(*c*), the mouth portion of head 600 is shown in an open state, illustrating the obtaining of a fourth data point 4 603. As shown, data point 4 670 may be defined by the middle back of the front teeth 601 to the farthest point of the hard/upper palate 602.

Referring now to FIG. 6(*d*), two additional data points are introduced. As shown, data point 5 683, being defined as the distance between the lowest point of an eye socket 681 to the top of teeth 682. And data point 6 692, being defined as the end of the nose cartilage 691 to the top of the teeth 682.

Figure 7B:
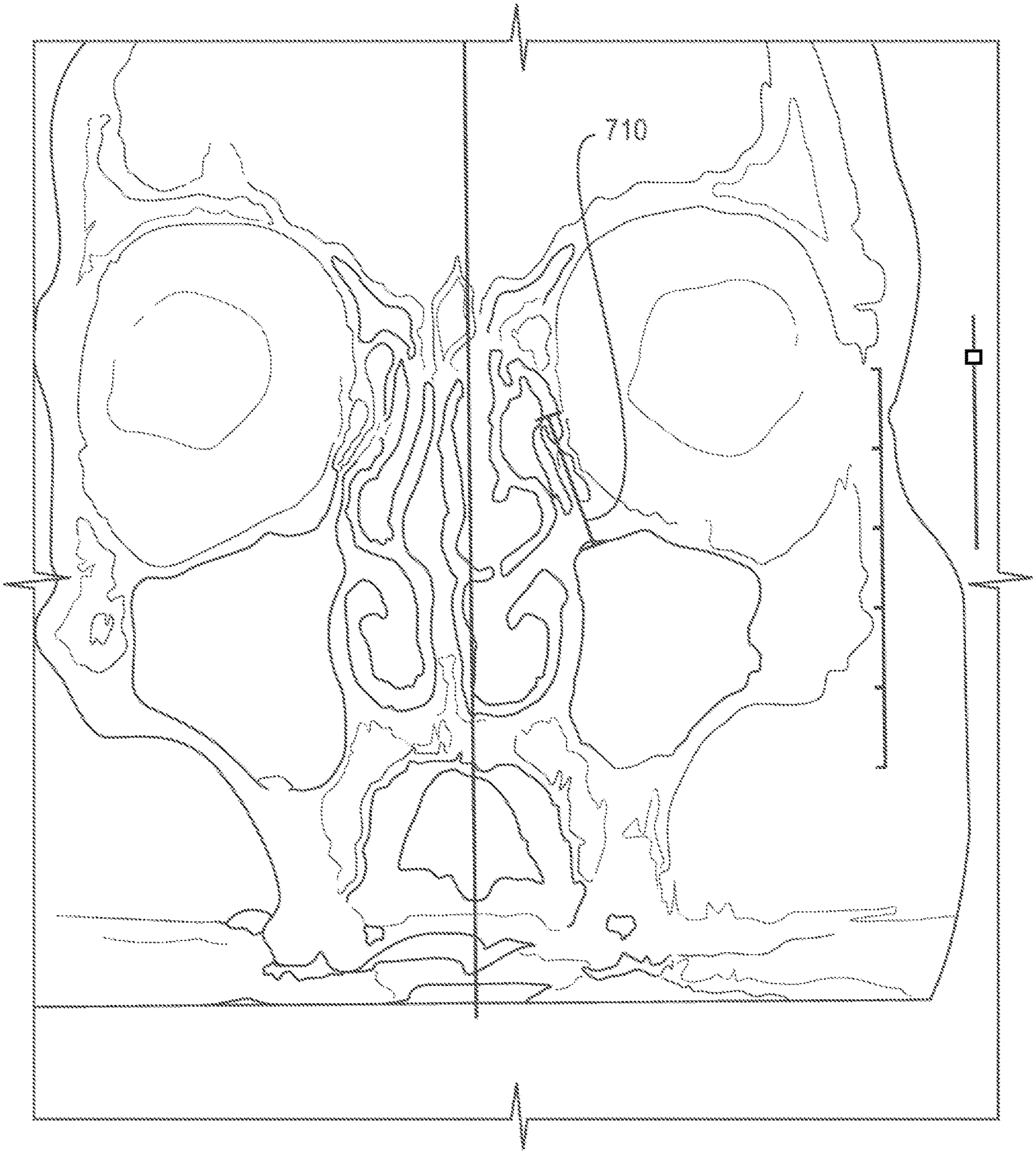
FIGS. 7(*a*)-(*c*) is an exemplary table incorporating the data of FIGS. 6(*a*)-(*d*), and explanatory diagram explain how the data obtained in FIGS. 6(*a*)-(*d*) are employed to approximate sinus dimensions.
Figure 7C:
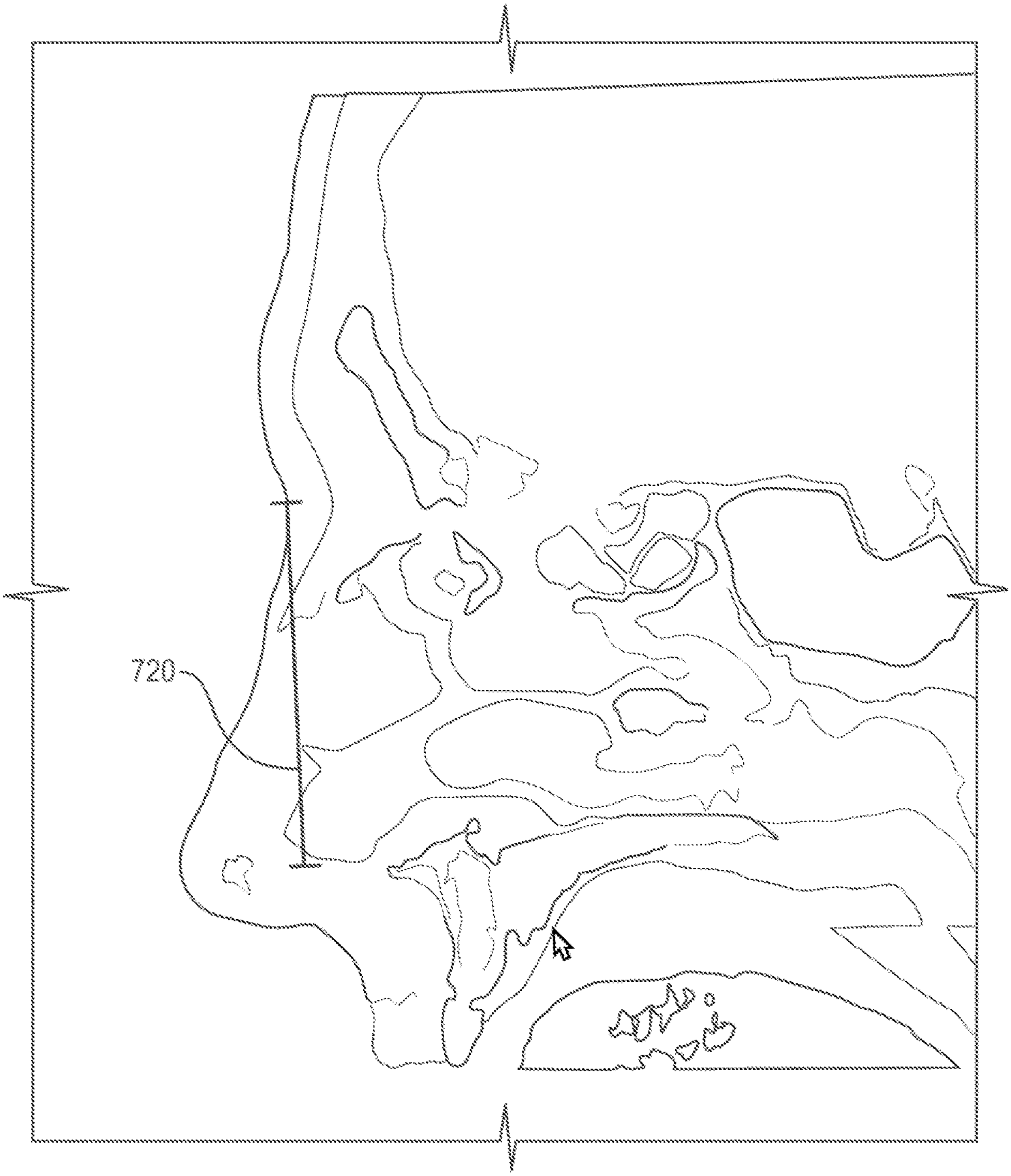

As exemplarily shown in FIG. 7(*a*), the various data points may be entered into a table 700. As shown, each of the measurements may be taken for both a right side or a left side of a user, or both. According to the aspects disclosed herein, once at least one, some, or all of the measurements in an instance for at least one or both sides are entered, a processor 110 (as described in FIG. 1), may generate a resonate frequency employing method 200. Collectively, data points 1-6 may be referred to as critical measurements. However, employing the aspects disclosed herein, an exemplary implementation may use various permutations or combinations of those measurements, along with those not discussed, and other methods to generate a resonant frequency using a formula to determine one or more resonant modes/frequencies (as shown in FIG. 5).

The critical measurements, data points 1-6 may be electrically communicated to the system 100, via one or more 10 devices 130. In a first embodiment, the measurements are manually measured via one or more measuring devices, and communicated to the IO devices 130.

Referring to FIGS. 7(*b*) and 7(*c*), a front-view and a side-view of a CT scan is shown to indicate the parameters necessary to produce a resonant frequency as employed by the various systems and methods disclosed herein. As shown, in FIG. 7(*b*) a length of the maxillary sinus is shown via measurement 710. As shown, in FIG. 7(*c*), a diameter of the maxillary sinus is shown via measurement 720.

The inventors have discovered that a relationship to generate the resonant frequency for each of the right or left maxillary sinus may be obtained by exterior measurements, either obtained by manual measurements or a photograph of a user's face.

The relationship for determining resonant frequency 121 is:

$$f_0 = \frac{c}{2\pi}\left[\frac{\frac{\pi d^2}{4}}{V(l+.85d)}\right]^{1/2} \quad \text{[equation 1]}$$

Where:

fo is the resonant frequency 121 in hertz;

c is the speed of sound (34.3 cm/s);

π is 22/7 (used to 8 decimal places);

d is the ostial diameter for a respective right or left maxillary sinus;

l is the ostiometeal length for a respective right or left maxillary sinus;

V is the volume of the maxillary sinus for a respective right or left maxillary sinus.

As noted above, with references to FIGS. 7(*b*) and 7(*c*), conventionally, a CT-scan is needed to at least obtain the values for the ostial distance and the ostiometeal length. However, according to an exemplary embodiment, the inventors have found that the following relationship may be used to solve for the ostiometeal length (l), ostial diameter (d), and maxillary sinus volume (V), —for a respective left and right sinus. The following relationships may be employed for the calculation of a resonant frequency:

maxillary_volume (V)=width_weight×datapoint1 [640]×height_weight×datapoint5 [683]×length_weight×MSL [equation 2]

maxillary_ostial_diameter (d)=datapoint 2 [650]/(ostial_weight) [equation 3]

maxillary_ostiometeal_length (l)=MSL*ostiometeal_weight [equation 4]

MSL=length_weight*(datapoint 3 [660]−datapoint 6 [691]) [equation 5]

The embodiment described above does not utilize datapoint 5 603. The inventors have discovered while said measurement may be used, as long as all the weights are set to 1, data point 5 603 may be omitted in generating a resonant frequency 131 effective in producing therapeutic benefits according to the aspects disclosed herein.

Each of equations 2-4 are solved with the measurements discussed in FIGS. 6(*a*)-(*d*). After a value is obtained for V, d, and l—a frequency for a respective right or left sinus is obtained. In one embodiment, a single frequency may be used for the right and left sinuses. In another embodiment, a right and left resonant frequency 131 may be solved for. Thus, at least two speakers may be situated on a right and left portion respectively (for example, via the frontal sinus), and used to drive the specific resonant frequency for each side.

Experiments have found that setting each of the weights to 1, has led to a modelling of frequency that when applied as the resonant frequency according to the various aspects disclosed herein, provides an effective therapy in combatting at least sinus-related issues. However, by collecting exact sinus dimensions for a number of patients (at least six), and measuring the various data points 1 . . . 6, applicants using equations 2-4 can solve for weights that approximate the various V, l, and d with greater accuracy using various tools, such as machine learning, linear and polynomial regression, and any other known technique for solving variables known to one of ordinary skill in the art.

Thus, equation 1 may be solved by setting each of the "_weight" to 1, and measuring the data points 1-6.

In another non-limiting example, the other data points may be estimated by using a data base that based on the known values, estimates the unknown values.

Figure 8:
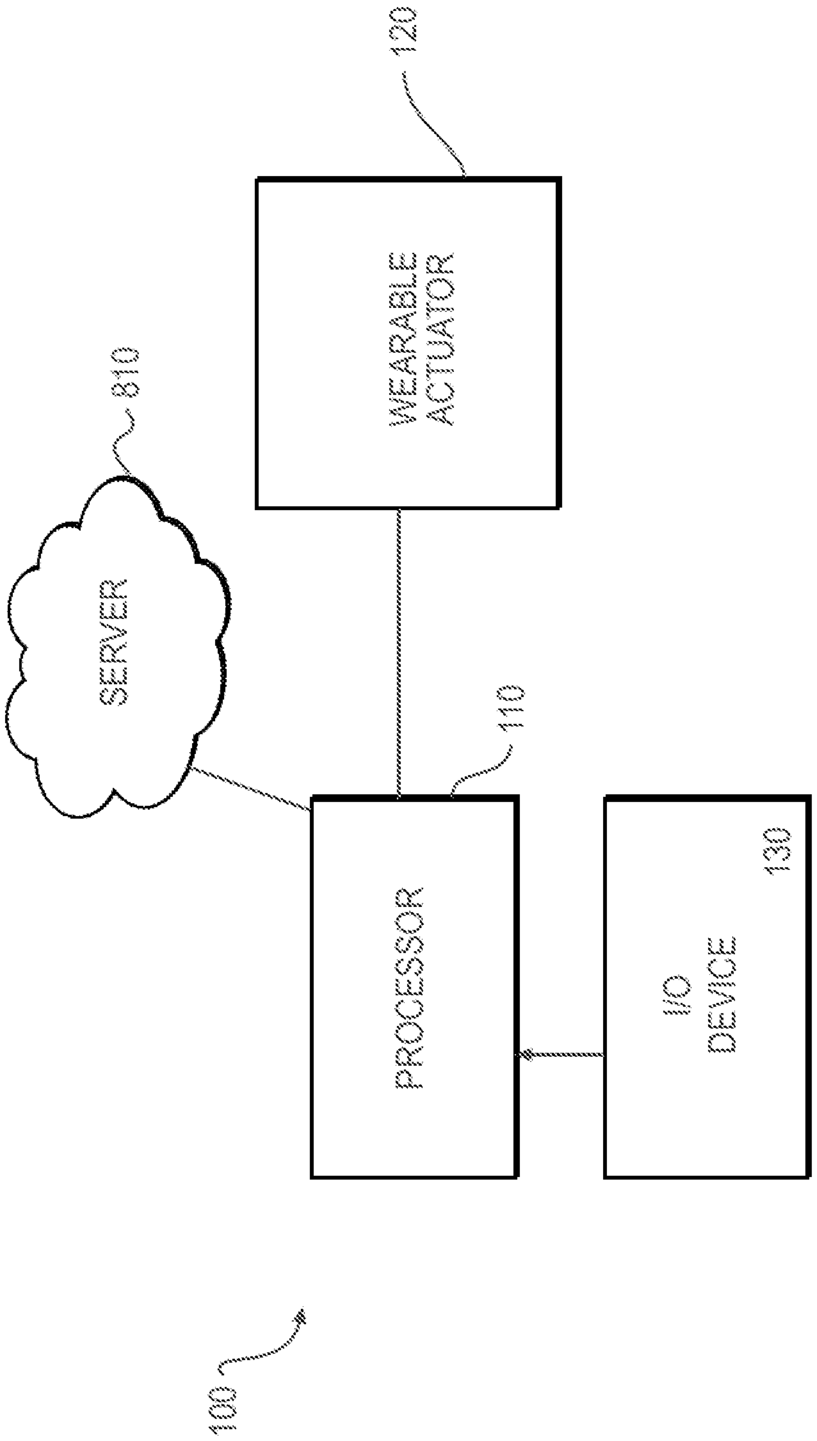
FIG. 8 is a block diagram illustrating a high-level description of another exemplary system according to the aspects disclosed herein.
Figure 9:
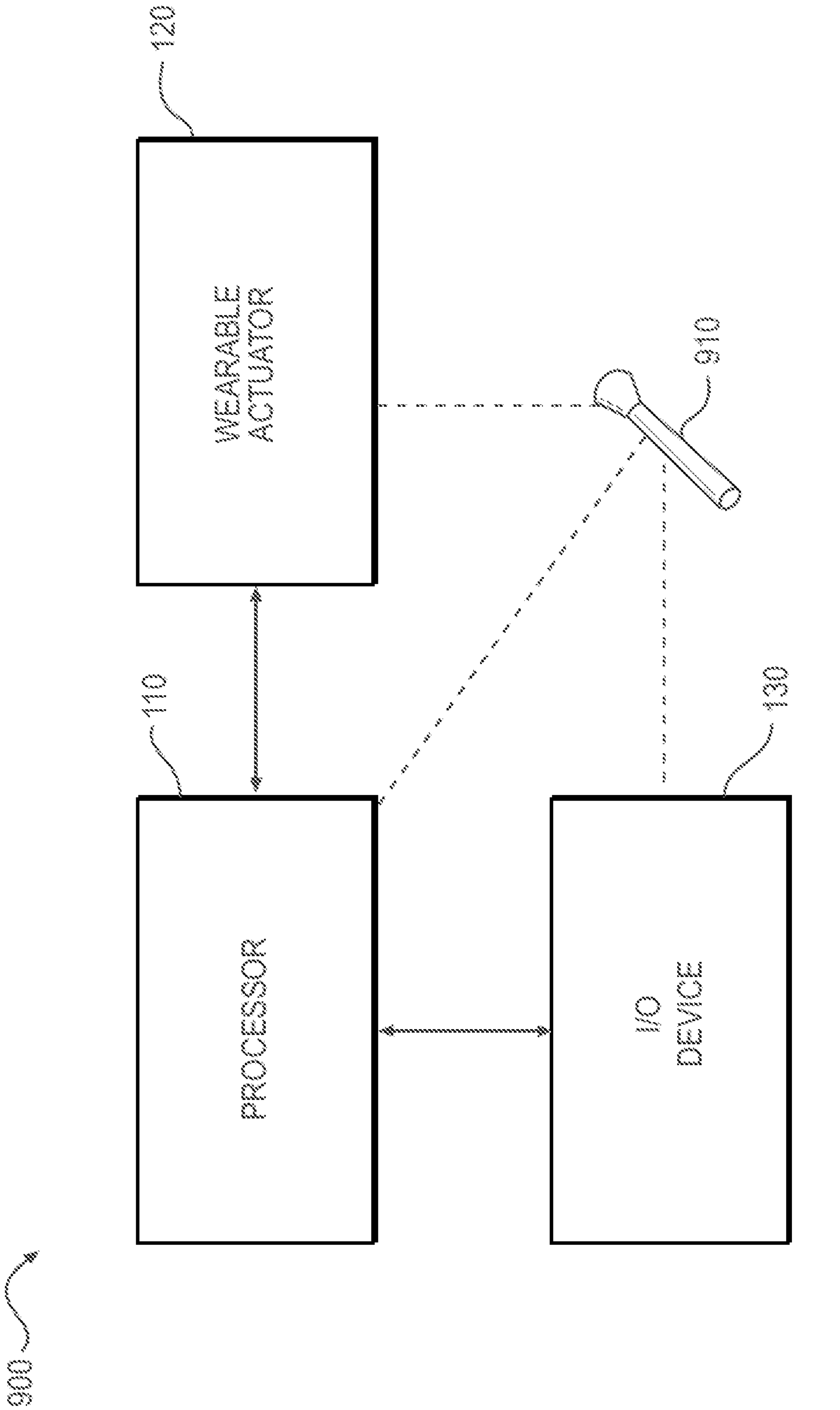
FIG. 9 is a block diagram illustrating a high-level description of another exemplary system according to the aspects disclosed herein.

In another exemplary embodiment, as depicted in FIG. 8 and in FIG. 9, the system 100 may be electrically coupled to a server 810, and in response to one or more of the critical measurements (data points 1-6) being received, but not a complete set, estimate the other critical measurements utilized by step 220 to perform the analysis required to produce a resonant frequency 230 by receiving those from the server 810.

For example, if data point 1 and 2 are measured, the system 100 may communicate to a server 810 and query for another patient (or patients) with a similar value for data point 1 and 2, and retrieve from the similar patient (or patients), the values for the remaining data points, or for the multiple patients, and average of the remaining data points. Alternatively, the server 810 may store default values when only one or two of the data points are known. The default values may dynamically change with time using the iterative processes described below with the methods described in FIGS. 10 and 12.

In addition to manually entering in the critical measurements, various imaging devices may be used. An exemplary, but not limiting list of said imaging devices may be:

A) 2D camera;

B) 3D camera;

C) X-ray;

D) CT Scan; and

E) MRI.

Referring to the list above, the various technique may be used individually or in combination, to obtain one, some, or all of the critical measurements required to produce a resonant frequency. The various imaging devices may be provided with the systems disclosed herein, or alternatively, be separately provided, with the data ultimately being communicated to the systems.

Additionally, the user of the systems described herein may additionally provide an existing photo (or photos), with one, some or all of the critical measurements obtained from said photo.

FIG. 9 illustrates an alternate embodiment of system 900 according to the aspects disclosed herein. The similar components of system 900 are shown, with an explanation omitted. Additionally shown in FIG. 9 is a microphone 910. The microphone 910 may be a contact or air microphone, situated near the wearable actuator 120, or integrated into the wearable actuator 120.

Information from the microphone 910 may be communicated to any of the devices shown in FIG. 9, directly or through another device.

Figure 10:
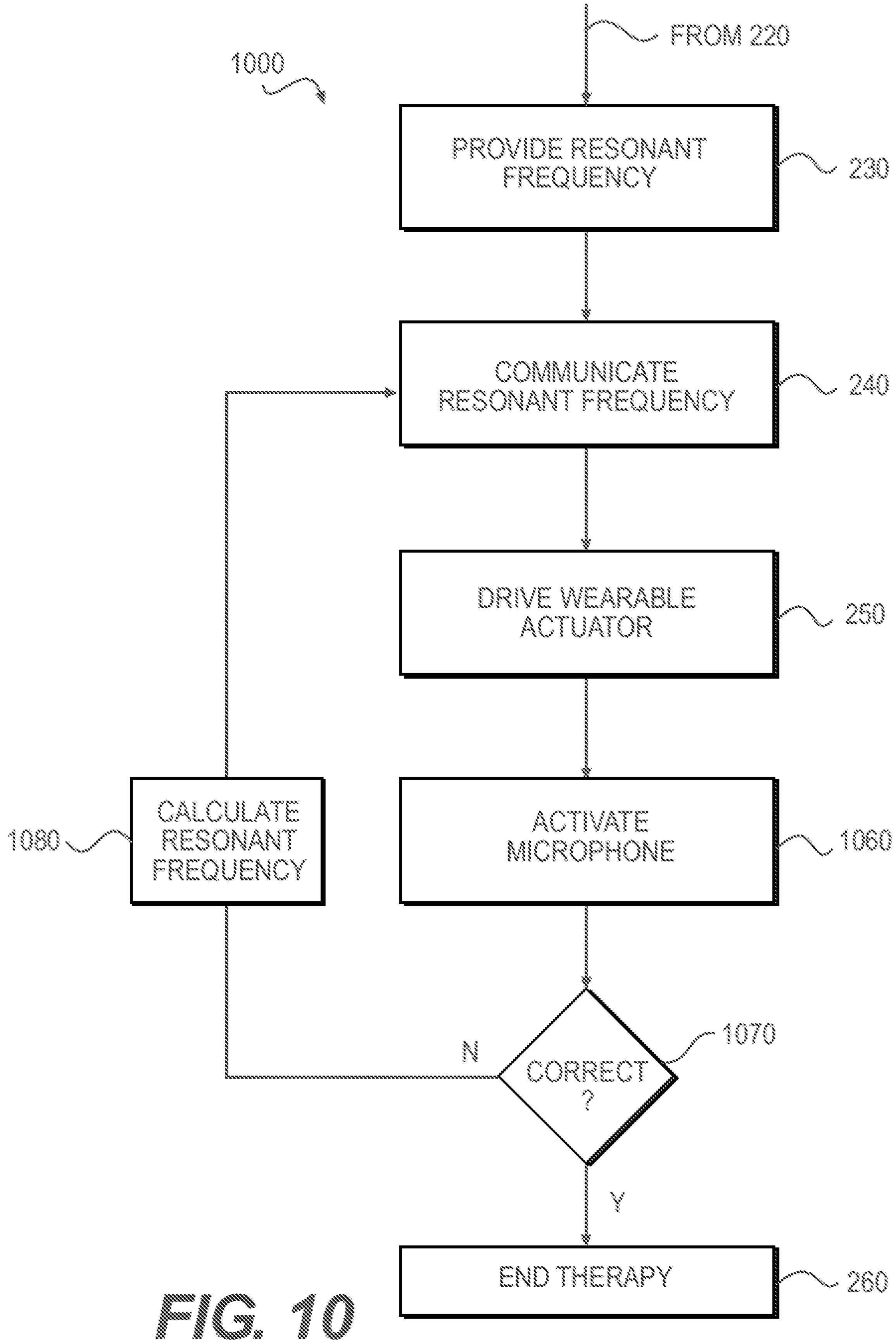
FIG. 10 illustrates a method for utilizing the system of FIG. 9.

FIG. 10 illustrates a first method 1000 for incorporating the microphone. The similar components of method 200 are omitted, and method 1000 may operate similarly.

As shown, after step 230, the resonant frequency 121 is provided (as calculated by system 100 or 900), and communicated to wearable actuator 120. Similar to method 200, the wearable actuator 120 is driven (thus the calculated resonant frequency is applied for the predetermined time).

In another embodiment, the resonant frequency 121 may be retrieved from a storage device, such as one locally provided or through a server 810. The retrieved resonant frequency 121 may be a default resonant frequency 121 (for example, a median value of all users of the systems disclosed herein, a subset of user's with similar features, or provided based on the ailment being associated with the therapy).

In FIG. 10, the microphone 910 is activated (1060) and measures the resonant frequency response. The measured resonant frequency response is analyzed in step 1070. If the analysis determines that the measure resonant frequency response is of a correct value or within a predetermined threshold of a correct value, the therapy finishes and proceeds to end 260 (similar to method 200, the therapy is applied for a predetermined time). The resonant frequency response correct value may be a value previously recorded when the user has used the system, or a value associated within a range of a correct resonant frequency for a user of similar attributes.

However, if the determination is that the measured resonant frequency response is not correct, a new resonant frequency is calculated 1080 and communicated to step 230, where the updated resonant frequency 121 is provided. The updated resonant frequency 121 may be derived from the previous resonant frequency 121 by adding or subtracting a predetermined amount. The decision to add or subtract may be based on whether the resonant frequency response is under the band of correct values or above the band of correct values.

In this manner, the method 1000 may iteratively happen until the optimal resonant frequency 121 is provided (a resonant frequency 121 within the correct band associated with the determination in step 1070). Once an optimal resonant frequency is determined, the system 900 may record/store this resonant frequency 121 for subsequent employments of method 1000.

Additionally, as shown in FIG. 8, the stored resonant frequency 121 may be communicated to the server 810, and stored in a remote location. As such, if the user associated with the resonant frequency wears another wearable actuator 120, if the user has identified him/herself via the system 100/900 (or any of the systems disclosed herein), the resonant frequency 121 may be provided automatically.

Figure 11:
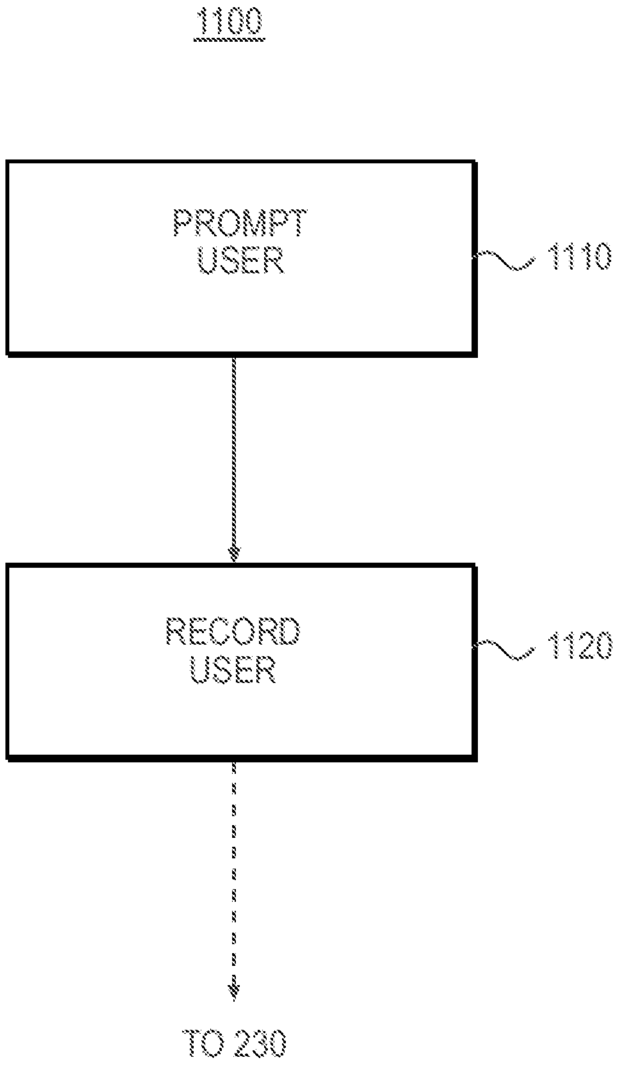
FIG. 11 illustrates an alternate method for utilizing the system of FIG. 9.

FIG. 11 illustrates a method 1100 employing the aspects disclosed herein to produce a resonant frequency employable by any of the systems or methods disclosed herein. Method 1100 is provided to use in addition to utilizing an IO device 130 (or devices) to receive the critical measurements.

As shown in FIG. 11, step 1110 a user is prompted to say one phrase, or many phrases that are predetermined.

At step 1120, the microphone 910 may record the dictation. Afterwards, the dictation may be used through a conversion program to estimate a resonant frequency 121. This may be accomplished by previously having a variety of different users record the phrases while healthy, and storing a known/observed resonant frequency (for example, using the formal described in equation 1). Thus, various elements of the recorded dictation could be matched with the stored users, and based on matching certain criteria, a resonant frequency 121 may be provided.

Alternatively, the dictation may be compared against a previous dictation made by the user when the user was healthy (or symptom free). Based on differences between the user's recently recorded dictation versus the previously recorded dictation, the resonant frequency 121 may be adjusted based on a predetermined amount. This predetermined amount may be discovered through experimentation where differences in the phrases are correlated to a resonant frequency adjustment.

After which, the system 900 may produce a resonant frequency 121 based on information obtained in method 1100. The inventors have found that various methods to translate received sounds through a user dictating certain phrases, may be employed to provide therapies associated with remedying or alleviating the problems caused by sinusitis or the ailments discussed herein.

In addition to all the methods disclosed herein, artificial intelligence and machine learning may be used to iteratively determine an optimal provided resonance. Additionally, if the systems 100/900 (or the other systems disclosed herein), are connected to a server 810, the user characteristics may be compared against other users of similar characteristics, and an optimal resonant frequency may be provided based by aggregating multiple user data.

Figure 12:
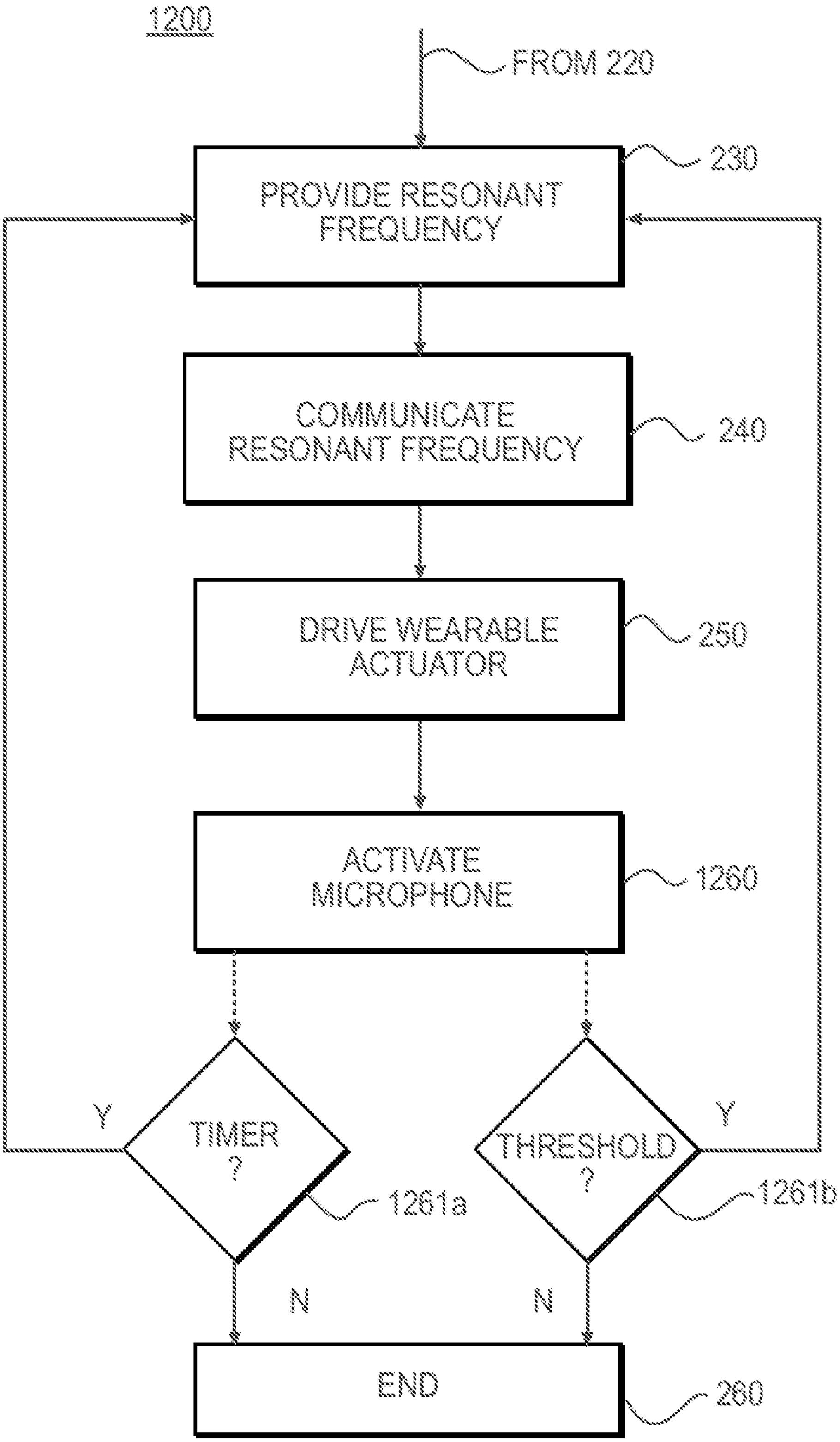
FIG. 12 illustrates an alternate method for utilizing the system of FIG. 9.

FIG. 12 illustrates a method 1200 for employing the microphone 910 to dynamically alter the provided resonance. The method 1200 may be incorporated with any of the methods disclosed herein after step 230, 240, 250 (or the other methods disclosed). As shown, and like the other methods disclosed herein, a resonant frequency is provided 230, the provided resonant frequency is communicated to a wearable actuator 120, and the wearable actuator 120 is driven/operated so as to apply the resonant frequency to the paranasal sinus points (as described in this application) 250.

In method 1200, the microphone 910 is activated at 1260. The microphone 910 may be independently provided or incorporated with the microphone 910 application discussed in the various embodiments disclosed herein. The microphone may be in contact with the user's face (and more specifically on or near one or more of the paranasal sinuses), or an air microphone.

After which, after a predetermined time 1261*a* and a resonant frequency response has changed, or if a resonant frequency has changed over a predetermined threshold 1261*b* (in an alternate embodiment), a new resonant frequency may be provided, with the method 1200 iteratively returning to step 230. In this way, the resonant frequency may be altered incrementally in either an upward or downward motion so that the resonant frequency response generated and recorded by the microphone matches a stored ideal resonant frequency, or a previously recorded resonant frequency in which the user was not suffering from an ailment (such as those described herein).

If neither case occurs, the method 1200 may proceed to step 260, where a determination may be made as to whether the therapy is effective. This can happen in a multiple of ways. In one embodiment, the therapy associated with method 1200 may be configured to time out after a predetermined time. Alternatively, if the resonant frequency has changed to an amount that is deemed acceptable, the method 1200 may proceed to an end 260.

Method 1200 is disclosed to provide greater flexibility in the therapy, as experiments have shown that the therapies disclosed herein are effective in alleviating sinus pains. As such, as the nasal cavities improve (i.e. are less inflamed or have less mucus), the provided resonant frequency may also change as well based on the change of mucus in the passages.

The wearable actuator 120 will be described in greater detail and shown in FIG. 13(*a*). As shown, a wearable actuator 120 may be shaped as a band that can be wrapped around a forehead of a user. Embedded in the wearable actuator 120, are bone conduction speakers 1320 in a housing 1310. The housing 1310 may be a non-attenuating fabric or material. The bone conduction speakers 1320, may be placed so as to be proximal with both the left and right frontal sinus. In an alternate embodiment, the wearable actuator 120 may be fashioned to allow the bone conduction speakers 1320 to be situated to the other paranasal sinuses described herein. However, through experimentation, the inventors have discovered that the location of the band relative to the frontal sinus leads to more effective placement and less displacement of the device during operation.

Figure 13B:
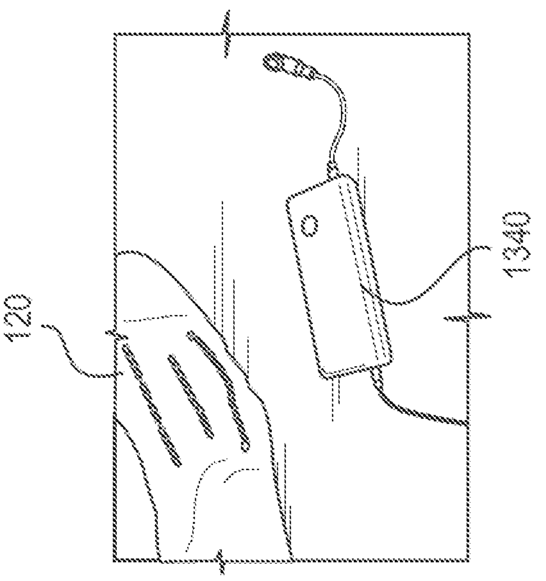
FIGS. 13(*a*) and (*b*) illustrate an exemplary version of a wearable actuator according to the aspects disclosed herein.
Figure 13A:
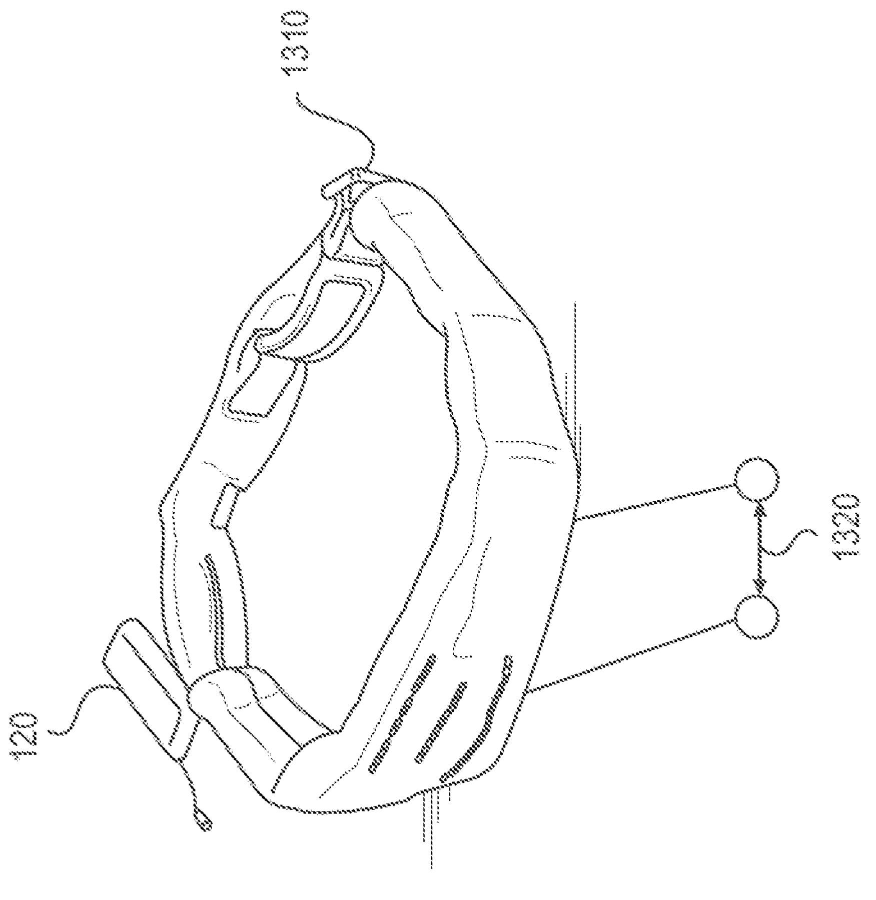

Also shown is FIG. 13(*b*). In FIG. 13(*b*), the wearable actuator 120 is electrically coupled to a speaker amp/driver 1340. However, in other embodiments, the speaker amp/driver 1340 may be incorporated with one of the systems described herein.

Not shown with the wearable actuator 120 is microphone 910. As explained above the microphone 910 may be embedded with the wearable actuator 910 or separately provided. The microphone 910, for example, may be associated with the systems 100 and 900.

An exemplary embodiment may be a wearable actuator 120, as shown in FIG. 13, electrically coupled to a personal device (not shown) and designed to be worn as a head band. However, other implementations may be provided such as provided as integrated via clothing (i.e. a hat), attached to a mask, worn over the ears, attached to piercings, or attached via adhesive.

The personal device (not shown), may be a smart phone, laptop, smart watch, tablet, or any device with a processor 110. Additionally, the personal device may utilize an IO device 130, such as a keyboard, touch screen, microphone, camera, or any other devices commonly associated with personal device and readily know to those of ordinary skill in the art.

In another embodiment, the provided resonant frequency 121 may be incorporated into music. For example, a user's playlist or personal music collection may be scanned. And based on the preference, the provided resonance may be mixed into a predetermined musical selection associated with the user's musical collection. Alternatively, the user may select music associated with their tastes.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for applying therapy, comprising:

a data store comprising a non-transitory computer readable medium storing a program of instructions;

a processor that executes the program of instructions, wherein the processor is configured to:

receive an image of an exterior portion of a face of a user, receive characteristics about the user wearing a wearable actuator from the image, wherein the received characteristics are defined by at least two measured crano-facial points, wherein at least two measured crano-facial points are configured to be defined by at least two of the following:

a distance between an eye edge of the user and a nostril edge of the user, a distance between the nostril edge of the user's nose and a nasal midpoint of the user's nose, a distance between a top portion of the user's nose and a top of the user's teeth, a distance between a lowest point of the user's eye socket to the top of the user's teeth, and a distance from an end of the user's nose cartilage to the top of the user's teeth;

determine, based on the received characteristics, a resonant frequency associated with the user;

communicate to the wearable actuator the resonant frequency, and drive the wearable actuator to apply the resonant frequency to the user;

wherein the wearable actuator is configured to be worn on a frontal sinus of the user and to deliver the resonant frequency via sound.

2. The system according to claim 1, wherein the received characteristics are configured to be extracted from the image of the user.

3. The system according to claim 2, wherein the image is provided by the user's personal device.

4. The system according to claim 2, wherein the image is sourced from a stored image of the user.

5. The system according to claim 1, wherein the wearable actuator is a bone conduction speaker.

6. The system according to claim 5, wherein the wearable actuator is at least two bone conduction speakers.

7. The system according to claim 1, wherein the wearable actuator comprises:
- a housing with a cavity;
- at least two bone conducting speakers in the cavity, wherein the two bone conducting speakers are configured to be disposed in a center position of the user's face to align with the user's frontal sinuses;
- an amplifier configured to receive data to produce the sound via the at least two bone conducting speakers; and
- an electrical coupling device to couple either in a wired or a wireless manner to the processor.

8. A method for applying sound to a sinus of a patient, the method comprising:
- providing a wearable actuator configured to be worn by the patient receiving the sound to the sinus;
- the wearable actuator further comprising:
- a data store comprising a non-transitory computer readable medium storing a program of instructions;
- a processor that executes the program of instructions, and is electrically coupled to the wearable actuator, and wherein the processor is adapted for:
- receiving a characteristic about the patient from an image of an exterior of the patient's face captured by a personal electronic device, wherein the characteristic is defined by at least two measured crano-facial points;
- wherein the at least two measured crano-facial points are configured to be defined by at least two of the following:
  - a distance between an eye edge of the patient and a nostril edge of the patient,
  - a distance between the nostril edge of the patient's nose and a nasal midpoint of the patient's nose,
  - a distance between a top portion of the patient's nose and a top of the patient's teeth,
  - a distance between a lowest point of the patient's eye socket to the top of the patient's teeth, and
  - a distance from an end of the patient's nose cartilage to the top of the patient's teeth;
- determining at least one volume from the characteristic;
- calculating a resonant frequency from the determined volume of the patient;
- applying sound via the resonant frequency to at least one paranasal sinus on the patient's head.

9. The method according to claim 8, wherein the received characteristic is configured to be extracted from the image of the patient.

10. The method according to claim 9, wherein the image is provided by the patient's personal electronic device.

11. The method according to claim 9, wherein the image is sourced from a stored image of the patient.

12. The method according to claim 8, wherein the wearable actuator is a bone conduction speaker.

13. The method according to claim 12, wherein the wearable actuator is at least two bone conduction speakers.

14. The method according to claim 8, wherein the wearable actuator comprises:
- a housing with a cavity;
- at least two bone conducting speakers in the cavity, wherein the two bone conducting speakers are configured to be disposed in a center position of the patient's face to align with the user's frontal sinuses;
- an amplifier configured to receive data to produce the sound via the at least two bone conducting speakers; and
- an electrical coupling device to couple either in a wired or a wireless manner to the processor.

* * * * *